(12) United States Patent
Turmeau et al.

(10) Patent No.: US 11,268,566 B2
(45) Date of Patent: Mar. 8, 2022

(54) CONNECTOR WITH INTEGRATED SWIVEL

(71) Applicant: SKF Aerospace France S.A.S, Montigny-le-Bretonneux (FR)

(72) Inventors: Arnaud Turmeau, Mallisard (FR); Florent Fauchery, Montmeyran (FR); Anthony Jerome, Lons-le-Saunier (FR); Nicolas Marotel, Portes lès Valence (FR); Noemie Peron, Valence (FR)

(73) Assignee: SKF Aerospace France S.A.S, Montigny-le-Bretonneux (FR)

( * ) Notice: Subject to any disclaimer, the term of this patent is extended or adjusted under 35 U.S.C. 154(b) by 797 days.

(21) Appl. No.: 15/983,164

(22) Filed: May 18, 2018

(65) Prior Publication Data
US 2018/0347622 A1    Dec. 6, 2018

(30) Foreign Application Priority Data

Jun. 6, 2017   (FR) ...................................... 1754984

(51) Int. Cl.
*F16C 11/06*        (2006.01)
*F16C 23/04*        (2006.01)

(52) U.S. Cl.
CPC ...... *F16C 11/0614* (2013.01); *F16C 11/0604* (2013.01); *F16C 11/068* (2013.01); *F16C 11/0685* (2013.01); *F16C 23/043* (2013.01); *F16C 2220/28* (2013.01); *Y10T 403/32213* (2015.01)

(58) Field of Classification Search
CPC . F16C 11/0604; F16C 11/0614; F16C 11/068; F16C 11/0685; F16C 23/043; F16C 23/045; F16C 2220/28; Y10T 403/32131; Y10T 403/32155; Y10T 403/32196; Y10T 403/32213
USPC ................ 403/68, 71, 76, 78; 384/203, 206
See application file for complete search history.

(56) References Cited

U.S. PATENT DOCUMENTS

| 3,516,136 | A  | 6/1970  | Carter et al. |
| 4,243,192 | A  | 1/1981  | Johnson |
| 4,253,711 | A  | 3/1981  | Lynn |
| 6,500,515 | B1 | 12/2002 | Fantino |

(Continued)

FOREIGN PATENT DOCUMENTS

| CN | 102235425 A    | 11/2011 |
| DE | 202004013252 U1| 12/2005 |

(Continued)

*Primary Examiner* — Josh Skroupa
(74) *Attorney, Agent, or Firm* — Garcia-Zamor Intellectual Property Law; Ruy Garcia-Zamor; Bryan Peckjian (57) ABSTRACT

A connector for connecting two members having a body of composite material consisting of reinforcing fibers embedded in a plastic matrix of resin, for connecting the two members to one another, and having a housing, a mounting ring installed in the housing, a swivel installed in the mounting ring and capable of allowing, by swivelling in the mounting ring, articulation between the two members to be connected, the swivel acting as a fastening area for one of the two members. The reinforcing fibers form, with the resin, plies which, when stacked, form a laminate, and the mounting ring is fastened in the housing of the body of the connector to prevent any movement of the mounting ring relative to the body of the connector.

17 Claims, 6 Drawing Sheets

(56) References Cited

U.S. PATENT DOCUMENTS

| | | | |
|---|---|---|---|
| 8,393,791 B2* | 3/2013 | Thornton | F16C 23/043 384/277 |
| 8,505,204 B2* | 8/2013 | Reverchon | F16C 11/0614 403/122 |
| 8,585,291 B2* | 11/2013 | Bridgewater | F16C 23/043 384/203 |
| 8,690,438 B2* | 4/2014 | Karaki | F16C 33/043 384/300 |
| 9,227,280 B2* | 1/2016 | Howard | F16C 11/0614 |
| 9,366,296 B2* | 6/2016 | Abrudan | F16C 23/045 |
| 10,167,439 B2* | 1/2019 | Tohyama | F16C 11/0614 |
| 10,851,838 B2* | 12/2020 | Lawrence | F16C 11/068 |
| 2008/0040886 A1 | 2/2008 | Arnold | |
| 2008/0289183 A2 | 11/2008 | Lee et al. | |
| 2009/0304315 A1 | 12/2009 | Johnson | |
| 2011/0038576 A1 | 2/2011 | Thornton | |
| 2011/0262059 A1 | 10/2011 | Karaki et al. | |
| 2012/0051679 A1 | 3/2012 | Bridgewater | |
| 2012/0291287 A1 | 11/2012 | Reverchon | |
| 2015/0198204 A1 | 7/2015 | Abrudan | |
| 2015/0211579 A1 | 7/2015 | Lawrence et al. | |
| 2016/0114884 A1 | 4/2016 | Mandel et al. | |
| 2017/0368552 A1* | 12/2017 | Plumb | F16C 11/0614 |
| 2018/0163758 A1 | 6/2018 | Fauchery et al. | |

FOREIGN PATENT DOCUMENTS

| | | | |
|---|---|---|---|
| EP | 0818289 A2 | 1/1998 | |
| EP | 2379313 A | 10/2011 | |
| EP | 2665597 A | 11/2013 | |
| EP | 2711214 A1 | 3/2014 | |
| EP | 2955400 A1 | 12/2015 | |
| EP | 3076039 A1 | 10/2016 | |
| JP | S60151414 A | 8/1985 | |
| WO | WO-2014161560 A1 * | 10/2014 | F16C 11/068 |

* cited by examiner

CONNECTOR WITH INTEGRATED SWIVEL

CROSS-REFERENCE

This application claims priority to French patent application no. 1754984 filed on Jun. 6, 2017, the contents of which are fully incorporated herein by reference.

TECHNOLOGICAL FIELD

The invention relates to a connector comprising a body of composite material, such as a fitting, used to connect two members to one another.

BACKGROUND

Conventionally, in the aeronautical field, use is made of metal fittings, made of aluminium, titanium or steel for example, and comprising a metal ball swivel for connecting two members to one another while allowing one member to move by swivelling relative to the other. This is the case, for example, with a fitting for attaching a thrust reverser of an aircraft turbine.

However, the use of a fitting of composite material, that is to say one made of plastic material reinforced with fibers such as carbon fibers, is particularly helpful in fields where the gain in weight is essential, as in aeronautics for example.

Additionally, JP60151414A discloses the production of an arm of plastic material reinforced with fibers and comprising a ball swivel, by stacking successive layers of pre-impregnated fabric in two half-moulds and around the swivel. However, the installation of this component is complicated, time-consuming, and requires a large amount of manipulation.

Consequently, there is scope for improvement.

SUMMARY

The object of the invention is to provide a connector comprising a body of composite material consisting of reinforcing fibers embedded in a plastic matrix, to connect two members to one another while allowing swivelling to take place between the members by means of a swivel integrated into the connector body.

According to the invention, the fibers of the connector body are continuous and form, with the resin, plies or sheets which are stacked in parallel layers to form a laminate. The connector body further comprises a housing to receive a mounting ring, in which is formed the swivel that can swivel in the mounting ring.

Also according to the invention, the mounting ring is fastened in a housing of the connector body so as to prevent any movement of the mounting ring relative to the connector body.

Because of the invention, the connector may provide optimal transmission of force between the two members connected by the connector, while avoiding premature degradation of the body of the connector, by detachment of the plies of the laminate due to a pull-out effect.

According to other aspects of the invention which are advantageous but not obligatory, such a connector may incorporate one or more of the following characteristics:

the mounting ring comprises, on its inner periphery, a spherical surface matching the shape of a spherical surface of the outer periphery of the swivel;

the mounting ring resists pull-out stresses generated by the swivelling of the swivel;

a solid lubricant is placed on or integrated into the spherical surface of the mounting ring to facilitate the swivelling of the swivel in the mounting ring;

the mounting ring exerts a compressive force on a first and a second portion of the connector body in order to maintain mechanical cohesion between the plies of the laminate and the matrix to prevent delamination of the connector body;

the mounting ring has, on its outer periphery, a shoulder bearing against the first portion of the connector body, and a threaded surface that can receive a tightening nut which, by tightening against the second portion of the connector body, enables the compressive force to be created;

the mounting ring comprises, outside a central portion in contact with the housing of the connector body, two lateral flanges bearing on the portions of the body, so as to exert a retaining force on the portions;

the mounting ring takes the form of a self-lubricating fabric formed from a fabric impregnated with a binder and containing lubricating fibers and structural fibers to withstand the external loads transmitted to the connector, particularly the pull-out stresses;

the mounting ring consists of a solid ring made of BMC material and fastened in the housing of the connector body by gluing or overmolding;

the mounting ring comprises, outside a slightly concave cylindrical central portion in contact with a slightly convex cylindrical portion of the housing of the connector body, two oblique portions located one on each side of the central portion and also bearing in the housing of the connector body.

BRIEF DESCRIPTION OF THE DRAWINGS

The invention will now be described with the aid of the appended drawings, by way of example, with no limitation as to the subject matter of the invention. In the attached drawings.

DETAILED DESCRIPTION

Figure 1:
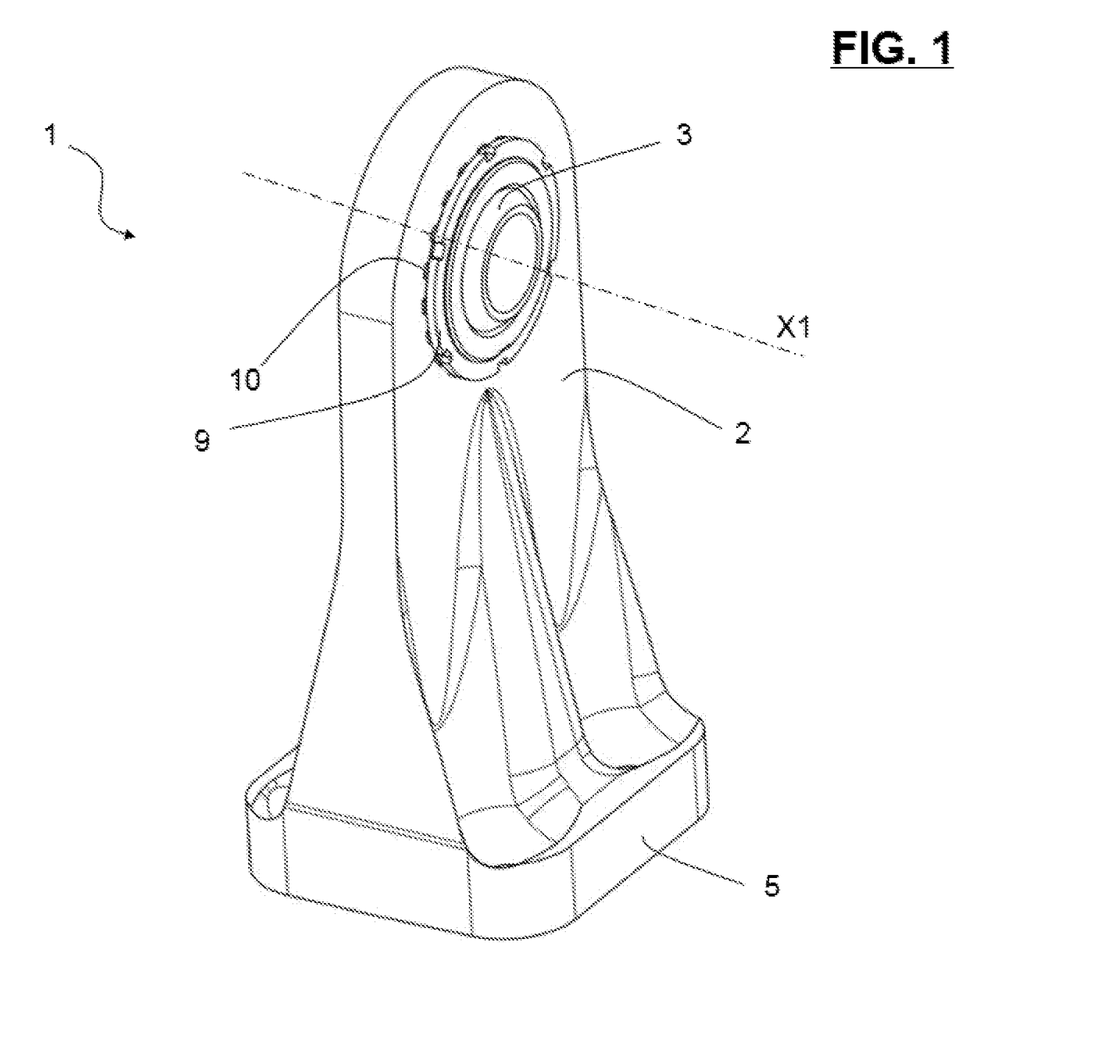
FIG. 1 shows a perspective view of a first embodiment, in the form of a fitting.
Figure 2:
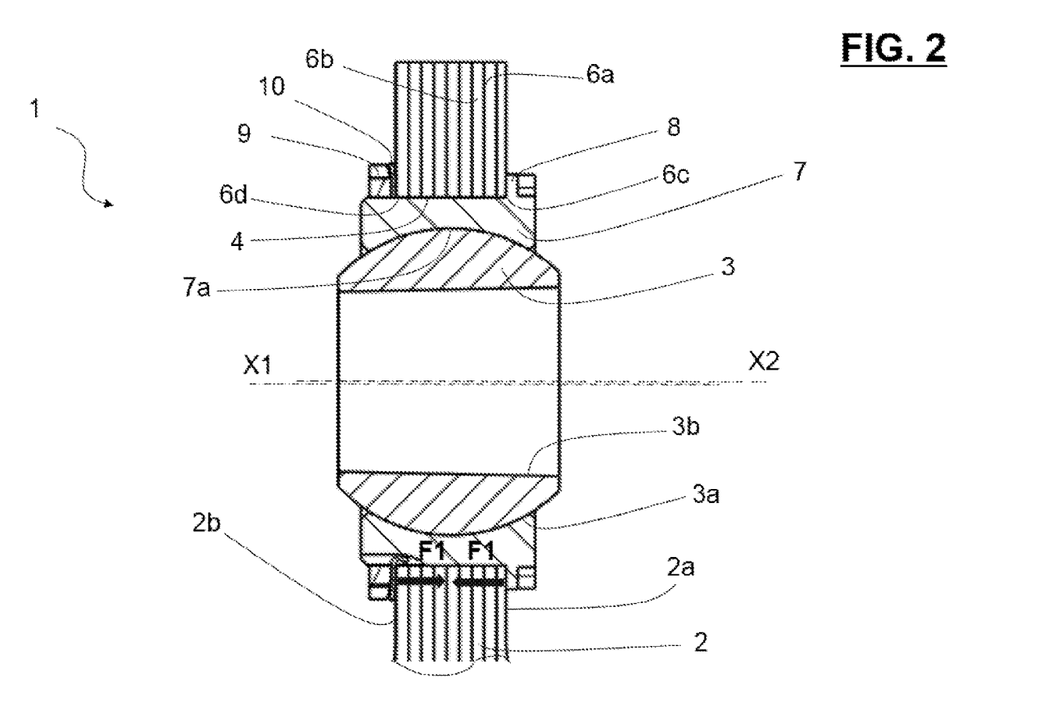
FIG. 2 shows an enlarged view of the area of attachment of the fitting of FIG. 1, in longitudinal section taken along a section plane including the axis of the housing.

FIGS. 1 and 2 show a connector 1 comprising a body 2 of composite material consisting of reinforcing fibers embedded in a plastic matrix 6b. The fibers are advantageously made of carbon, but may be made of another material such as glass. The plastic matrix 6b is made of thermosetting resin, epoxy for example, but other materials, for example thermoplastic resins such as PA66, may be used.

The connector 1 further comprises a fastening area for a first member (not shown) to be connected, in the form of a base 5 for example. Means (not shown) for fastening the first member to the connector 1 may take the form of screws or rivets.

The body 2 of the connector 1 comprises a housing 4 having an axis X1, which receives a mounting ring 7. The mounting ring 7 bears a swivel 3 with an axis X2 in its bore.

The swivel 3 acts as a fastening area for a second member (not shown) to be connected by means of the connector 1.

The swivel 3 is trapped in the mounting ring 7 but with a permanent clearance such that it can swivel in the mounting ring 7. This enables the two members to be connected rigidly while allowing for articulation between the two members to be connected, by the swivelling of the swivel in the mounting ring 7.

The swivel 3 comprises a spherical surface 3a on its outer periphery and a bore 3b on its inner periphery, having an axis having as its axis the axis of the swivel X1, by means of which bore the second member can be connected.

The fibers of the connector body are continuous and form, with the resin, plies or sheets 6a. These plies 6a are stacked so as to form a laminate, as seen in FIG. 2 which shows a longitudinal section taken through the connector 1 along the plane which includes the axis X1 of the housing 4 and is parallel to the plies 6a. Advantageously, in order to simplify the manufacture of the body 2 of the connector 1, the plies 6a are parallel to one another. Additionally, the plies 6a extend over the whole length of the body 2, except in the area of the housing 7 in which they are partially interrupted to provide the housing 4, by removal of material, for example.

To provide optimal tensile and compressive strength, the plies 6a are perpendicular to the axis X1 of the housing 4, at least in the area of the body 2 around the housing 4 extending for several millimeters or tens of millimeters.

The mounting ring 7 is fastened in the housing 4 of the body 2 of the connector 1 so as to prevent any movement of the mounting ring 7 relative to the body 2 of the connector 1.

The mounting ring 7 comprises, on its inner periphery, a spherical surface 7a matching the shape of the spherical surface 3a of the outer periphery of the swivel 3.

If the swivel 3 were in direct contact with the body 2 of the connector 1 and its plies 6a, there would be a risk that the repeated forces generated during the swivelling of the swivel might eventually cause delamination of the composite material forming the body 2 of the connector 1, particularly in the area around the swivel 3. In particular, the most damaging forces would be the pull-out forces, defined as the resultants along the axis X2 of the housing 4 of the forces between the swivel and the second member attached thereto.

Consequently, it is the mounting ring 7, and not the body 2 itself, that resists the pull-out forces.

Advantageously, in order to facilitate the swivelling of the swivel 3 in the mounting ring 7, a lubricant such as a grease is placed between the swivel and the mounting ring 7. Alternatively or additionally, a solid lubricant, placed on or integrated into the spherical surface 7a of the mounting ring 7, is advantageously used to further facilitate the swivelling of the swivel in the mounting ring 7. This solid lubricant may take the form of a deposit or of microscopic particles, of PTFE material for example.

In the embodiment of FIGS. 1 and 2, the mounting ring 7 takes the form of a ring having on its outer periphery a shoulder 8 bearing against a first portion 2a of the body 2 of the connector 1, and a threaded surface that may receive a tightening nut 9. The tightening of the nut 9, via a resilient washer 10, against a second portion 2b of the body 2 of the connector 1 enables a compressive force F1 to be created. Advantageously, the first 2a and second 2b portions of the body 2 on which the compressive force F1 is generated are flat, parallel to one another, and parallel to the plies 6a of the laminate.

These first 2a and second 2b portions of the body 2 are joined to the housing 4 of the body 2 by two edges 6c, 6d.

Because of the compressive force F1 exerted on the first 2a and second 2b portions of the body 2 of the connector 1, the resistance to delamination of the body 2 or the rupture of the plastic matrix 6b is further reinforced, particularly at the edges 2c, 2d which are the most fragile areas of the body 2 of the connector 1.

This permanent compressive force F1 enables mechanical cohesion to be maintained between the fibers and the matrix 6b.

This compressive force F1 is applied in a direction perpendicular to the planes of the plies 6a.

In the embodiment of FIGS. 1 and 2, the outer periphery of the mounting ring 7 consists of a cylindrical surface whose shape matches that of a cylindrical surface formed in the housing 4 of the body.

Figure 3:
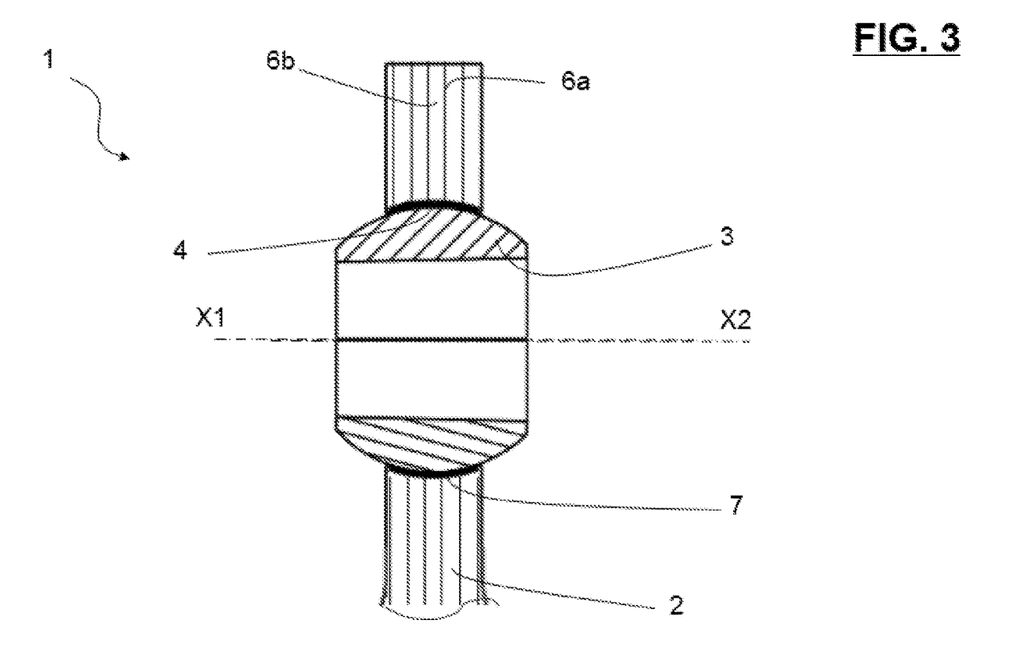
FIG. 3 shows a second embodiment.

FIG. 3 shows a second embodiment, elements identical to those of the first embodiment shown in FIGS. 1 and 2 having the same references. This second embodiment differs from the first embodiment in that the mounting ring 7 takes the form of a self-lubricating fabric. The self-lubricating fabric is fastened in the housing 4 of the body 2 of the connector 1 by any appropriate means, preferably by gluing.

The self-lubricating fabric consists of a fabric impregnated with a binder formed by a resin, and contains lubricating fibers and structural fibers to withstand the external loads transmitted to the connector 1, particularly the pull-out forces described above. Such a self-lubricating fabric is described in the document EP2955400A1, the content of which is incorporated herein by reference.

The self-lubricating fabric may, under the effect of the swivelling of the swivel 3, become elongated at certain points in the axial direction (parallel to the axis X1 of the housing 4) in such a way as to prevent the transmission, at the housing 4, of pull-out stresses to the plies 4a of the laminate.

Figure 4:
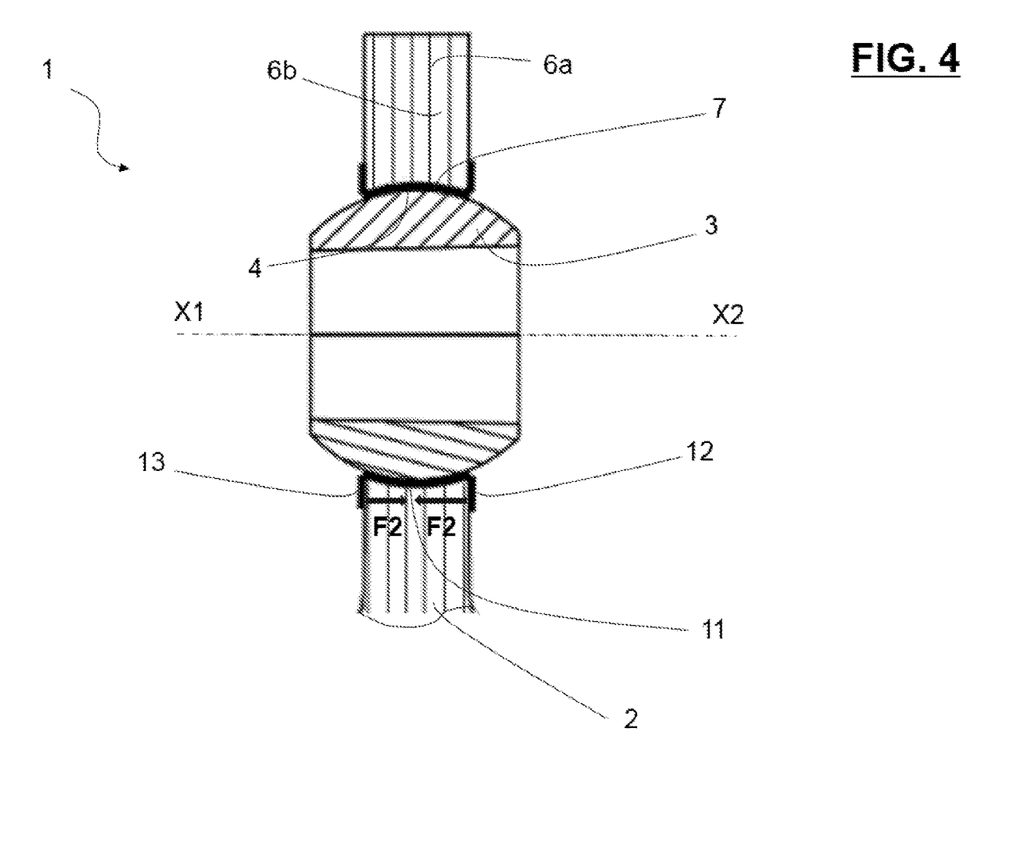
FIG. 4 shows a third embodiment.

FIG. 4 shows a third embodiment, in which the mounting ring 7 comprises, outside a central portion 11 in contact with the housing 4 of the body 2 of the connector 1, two lateral flanges 12 and 13 bearing on the portions 2a and 2b of the body 2. The two flanges 12 and 13 exert a retaining force F2 on the portions 2a and 2b of the body 2. This retaining force F2 may be obtained, for example, by plastic deformation of the flanges 12 and 13, using an appropriate implement.

In this embodiment, the mounting ring 7 may be made of metallic material or structural composite material, or a mixture of the two. The retaining force F2 is perpendicular to the plies 6a of the laminate 6a.

In another embodiment, not shown, a self-lubricating fabric 7 as described above for the second embodiment may be associated with a mounting ring 7 as described above for the third embodiment, the self-lubricating fabric being fastened in the bore of the mounting ring 7.

Figure 5:
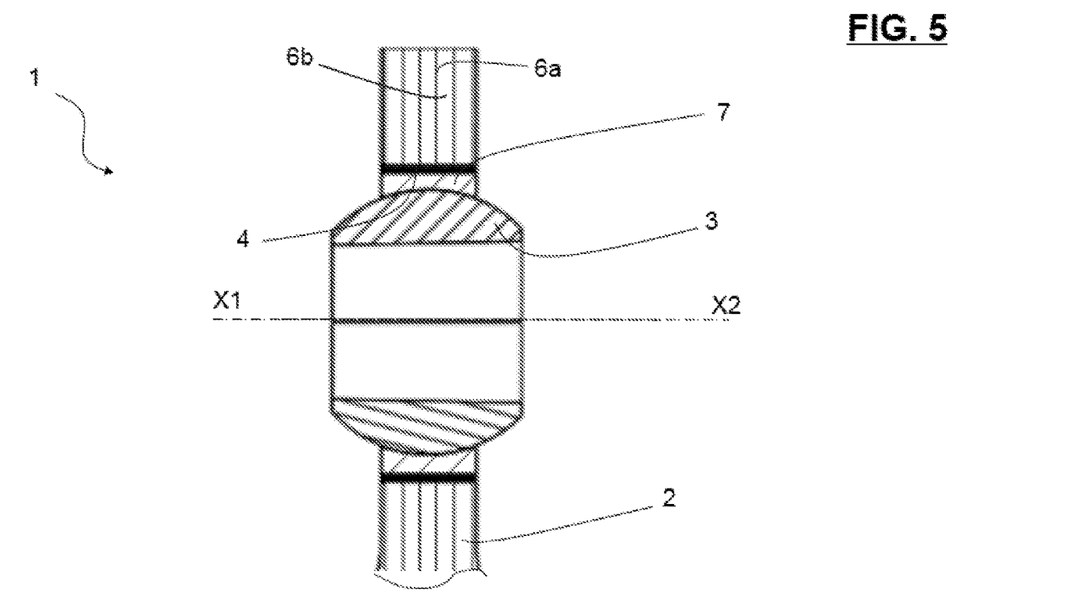
FIG. 5 shows a fourth embodiment.

FIG. 5 shows a fourth embodiment which differs from the embodiments described above in that the mounting ring 7 consists of a solid ring made of BMC (Bulk Molding Component in English) material. This BMC material is produced by mixing reinforcing fibers, preferably of carbon or glass, with a thermosetting resin, preferably polyester or epoxy. The reinforcing fibers are long fibers; that is to say, they each measure at least 1 millimeter. Fibers or nodules of solid lubricant such as PTFE may also be incorporated in the material, in order to facilitate the swivelling of the swivel 3 in the mounting ring 7.

The mounting ring 7 of BMC material is produced directly by compression molding, followed if necessary by stages of machining to impart complex shapes to it. The BMC mounting ring 7 may alternatively be produced by injection molding.

In this embodiment, the outer periphery of the mounting ring 7 consists of a cylindrical surface whose shape matches that of a cylindrical surface formed in the housing 4 of the body.

Additionally, the mounting ring 7 is advantageously fastened in the housing 4 of the body 2 of the connector by any appropriate means, preferably by gluing or overmolding.

Figure 6:
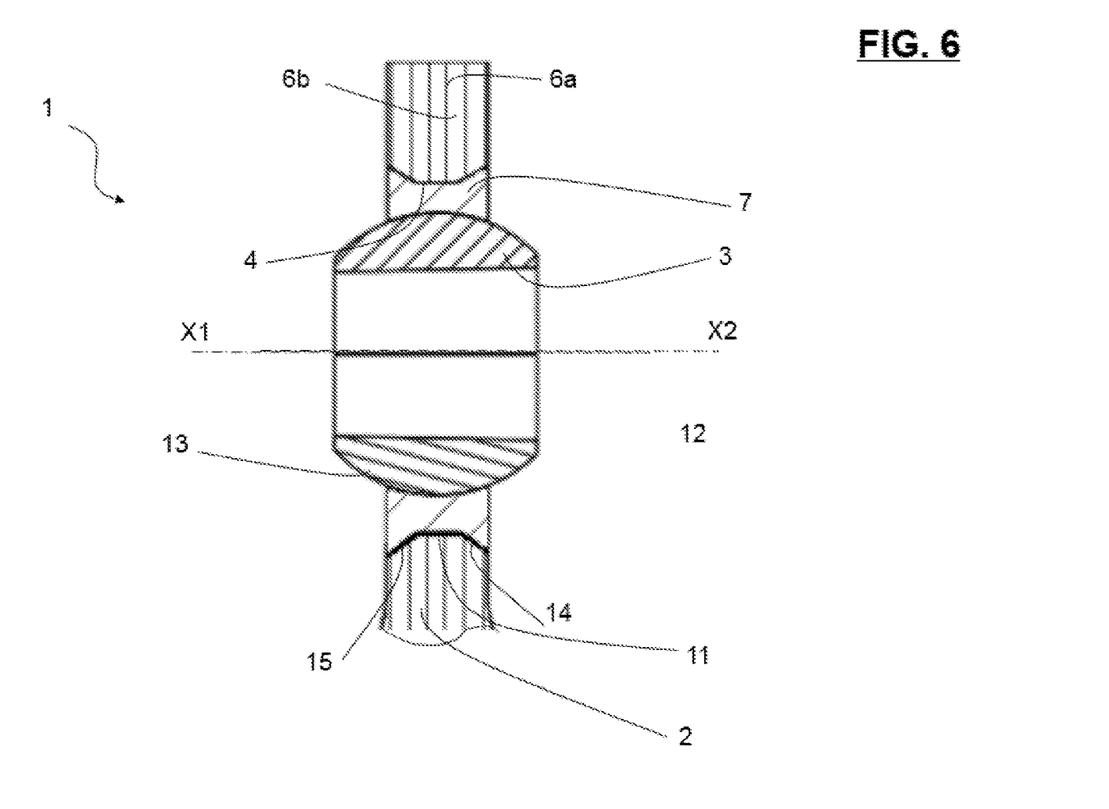
FIG. 6 shows a fifth embodiment.

FIG. 6 shows a fifth embodiment, derived from the fourth embodiment shown in FIG. 5. The mounting ring 7 comprises, outside a slightly concave cylindrical central portion 11 in contact with a slightly convex cylindrical portion of the housing 4 of the body 2 of the connector 1, two oblique portions 14 and 15, located one on each side of the central portion 11. The two oblique portions also bear, in the housing 4 of the body 2, against portions having a matching shape. Each portion 14, 15 has a thickness, in a direction perpendicular to the axis X2 of the housing 4, which increases towards the outside of the housing 4. This geometrical characteristic makes it possible not only to reinforce the axial strength of the body 2 in the area of mounting of the swivel 3, but also to transmit a closing force to the laminate by a wedge effect.

The invention has been described for a fitting for attaching two members, to be installed on an aircraft for example. By way of example, such a fitting connects a jet engine thrust reverser to the jet engine nacelle.

The invention has been described for a fitting for attaching two members, but it would be entirely possible to use it to connect three or more members to one another.

The invention could also be applied to a type of connector other than a fitting, for example a rod end or crank end, and could be used equally well for an application in the aeronautical field or any other technical field.

Additionally, the technical characteristics of the various embodiments of the invention may be combined with one another, wholly or in part. Thus, the connector may be adapted to the specific requirements of the application for which it is to be used.

LEGEND

F1 compressive force
F2 retaining force
X1, X2 axes
1 connector
2 body
2a, 2b portions
2c, 2d edges
3 swivel
3a spherical surface
3b bore
4 housing
5 base
6a plies
6b matrix
7 mounting ring
7a spherical surface
8 shoulder
9 nut
10 washer
11 central portion
12, 13 flanges
14, 15 oblique portions

What is claimed is:

1. A connector for connecting two members, the connector comprising:
a body manufactured from a composite material consisting of reinforcing fibers embedded in a plastic matrix of resin, for connecting the two members to one another, and having a housing,
a mounting ring installed in the housing, the mounting ring having a mounting ring central axis,
a swivel installed in the mounting ring and capable of allowing, by swiveling in the mounting ring, articulation between the two members to be connected, the swivel acting as a fastening area for one of the two members, wherein
the reinforcing fibers form, with the resin, plies which, when stacked, form a laminate, and
the mounting ring being fastened in the housing of the body of the connector to prevent any movement of the mounting ring relative to the body of the connector, the plies being configured as linear sheets each of which is positioned planar-perpendicular to the mounting ring central axis.

2. The connector according to claim 1, wherein the mounting ring comprises, on its inner periphery, a spherical surface matching the shape of a spherical surface of the outer periphery of the swivel.

3. The connector according to claim 1, wherein the mounting ring resists pull-out stresses generated by the swiveling of the swivel.

4. The connector according to claim 1, further comprising a solid lubricant is placed on or integrated into the spherical surface of the mounting ring to facilitate the swiveling of the swivel in the mounting ring.

5. The connector according to claim 1, wherein the mounting ring exerts a compressive force or a retaining force on a first and a second portion of the body of the connector, in order to maintain mechanical cohesion between the fibers and the matrix to prevent the delamination of the body of the connector.

6. The connector according to claim 5, wherein the mounting ring has, on its outer periphery, a shoulder bearing against the first portion of the body of the connector, and a threaded surface that can receive a tightening nut which, by tightening against the second portion of the body of the connector, enables the compressive force to be created.

7. The connector according to claim 5, wherein the mounting ring further comprises, outside a central portion in contact with the housing of the body of the connector, two lateral flanges and bearing on the portions of the body, so as to exert the retaining force on the portions of the body.

8. The connector according to claim 1, wherein the mounting ring takes the form of a self-lubricating fabric formed from a fabric impregnated with a binder and containing lubricating fibers and structural fibers to withstand the external loads transmitted to the connector, particularly the pull-out stresses.

9. The connector according to claim 1, wherein the mounting ring consists of a solid ring made of BMC material and fastened in the housing of the body of the connector by gluing or overmolding.

10. The connector according to claim 1, wherein the mounting ring further comprises, outside a slightly concave cylindrical central portion in contact with a slightly convex cylindrical portion of the housing of the body of the connector, two oblique portions and, located one on each side of the central portion and also bearing in the housing of the body of the connector.

11. A connector for connecting two members, the connector comprising:
- a body manufactured from a composite material consisting of reinforcing fibers embedded in a plastic matrix of resin, for connecting the two members to one another, and having a housing;
- a mounting ring installed in the housing, the mounting ring having a mounting ring central axis, the mounting ring having first and second axial ends;
- a swivel installed in the mounting ring and capable of allowing, by swiveling in the mounting ring, articulation between the two members to be connected, the swivel acting as a fastening area for one of the two members; and
- the reinforcing fibers form, with the resin, plies which, when stacked, form a laminate, and
- a first fastener and a second fastener securing the mounting ring to the body of the connector to prevent any movement of the mounting ring relative to the body of the connector, the first fastener and the second fastener being located on opposite sides of the body such that the laminate does not axially overlap the first and second fasteners, the first and second fasteners having first and second fastener axial ends, respectively, the first and second fastener axial ends being located axially inwardly from the first and second axial ends, respectively, of the mounting ring.

12. A connector for connecting two members, the connector comprising:
- a body manufactured from a composite material consisting of reinforcing fibers embedded in a plastic matrix of resin, for connecting the two members to one another, and having a housing;
- a mounting ring installed in the housing, the mounting ring having a mounting ring central axis, the mounting ring having first and second axial ends;
- a swivel installed in the mounting ring and capable of allowing, by swiveling in the mounting ring, articulation between the two members to be connected, the swivel acting as a fastening area for one of the two members; and
- the reinforcing fibers form, with the resin, plies which, when stacked, form a laminate, and a fastener securing the mounting ring to the body of the connector to prevent any movement of the mounting ring relative to the body of the connector, the fastener having first and second fastener axial ends, the first and second fastener axial ends being located axially inwardly from the first and second axial ends of the mounting ring,
- wherein the plies are configured as linear sheets each of which is positioned planar-perpendicular to the mounting ring central axis.

13. The connector according to claim 12, wherein the mounting ring comprises, on its inner periphery, a spherical surface matching the shape of a spherical surface of the outer periphery of the swivel.

14. The connector according to claim 12, wherein the mounting ring resists pull-out stresses generated by the swiveling of the swivel.

15. The connector according to claim 12, further comprising a solid lubricant is placed on or integrated into the spherical surface of the mounting ring to facilitate the swiveling of the swivel in the mounting ring.

16. The connector according to claim 12, wherein the mounting ring exerts a compressive force or a retaining force on a first and a second portion of the body of the connector, in order to maintain mechanical cohesion between the fibers and the matrix to prevent the delamination of the body of the connector.

17. The connector according to claim 16, wherein the mounting ring has, on its outer periphery, a shoulder bearing against the first portion of the body of the connector, and a threaded surface that can receive the fastener which, by tightening against the second portion of the body of the connector, enables the compressive force to be created.

* * * * *